Oct. 4, 1949.    C. GUILER    2,483,827
SEALING DEVICE
Filed Sept. 28, 1945
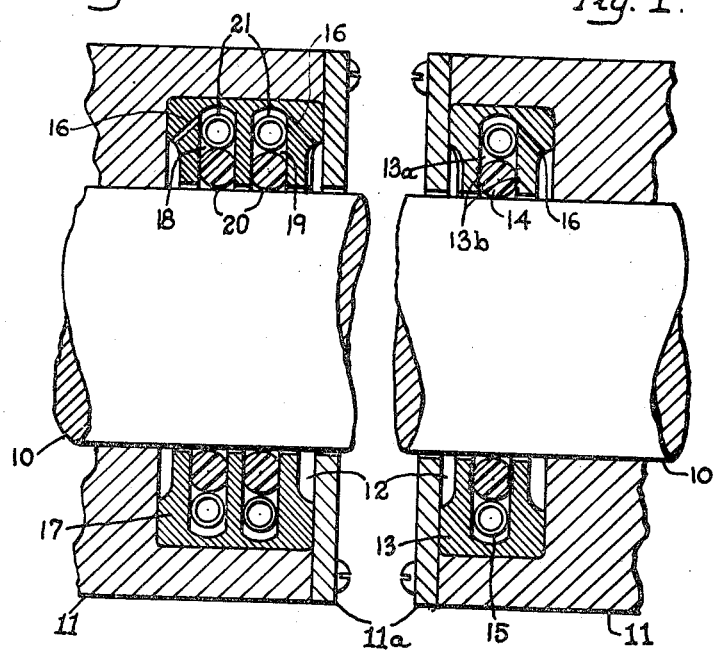
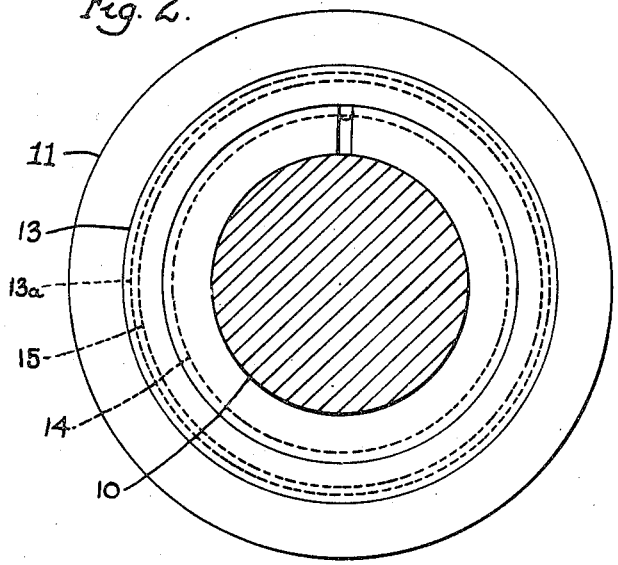
INVENTOR.
Cameron Guiler
BY Ernest R. Llewellyn
ATTORNEY.

Patented Oct. 4, 1949

2,483,827

UNITED STATES PATENT OFFICE 2,483,827

SEALING DEVICE

Cameron Guiler, Westboro, Mass.

Application September 28, 1945, Serial No. 619,155

1 Claim. (Cl. 286—5)

This invention relates to sealing devices and is particularly adapted to be associated with bearings and members supporting a rotating, reciprocating, oscillating, vibrating, stationary or like members or a coupling for such members.

It is well known that fluid lubricants and like elements, applied to a bearing supporting a coacting member, will be emitted from the bearing surfaces due to required clearances, pressures and other characteristics. It is also well known that stuffing boxes or glands provided with a lubricant or associated with pressure elements require constant attention and adjusting to prevent the elements from leaking.

Accordingly, one of the primary objects of the present invention is to provide a seal that will retain and confine the lubricant or like elements substantially within effective limits and surfaces and will retain or confine the elements by means of a self-tightening or adjusting type seal instead of requiring manual adjustment.

Another object of the invention is to provide a seal for bearings and the like that is readily adaptable to properly aligned or misaligned bearing members.

A further object of the invention is to provide a seal for bearings and other members that is so constructed and arranged in a manner that will prevent any accumulation of excessive internal pressures due to changes of temperature or other conditions.

A still further object of the invention is to provide a seal for bearings and other members that may be conveniently and easily assembled and wherein elements may be readily replaced without requiring the use of special tools or devices.

Still another object of the invention is to provide a seal that is simple and efficient with few working parts.

The foregoing objects are intended as a general statement and are not to be construed as limiting the invention thereto as other features and advantages of the invention will become apparent as the following detailed description progresses, references being had to the accompanying drawing wherein:

Fig. 1 is a longitudinal section of a bearing end supporting a rotatable member and having the present invention embodied therewith.

Fig. 2 is an end view of the parts shown at Fig. 1, with the bearing end cap omitted.

Fig. 3 is a view corresponding substantially to Fig. 1 but shows an adaptation of the present invention to form a double fluid seal.

As illustrated, the rotatable member 10 is supported in a bearing 11 having an annular chamber 12 adapted to receive the fluid seal housing 13, that is retained in its seated position by the bearing end cover 11a.

The housing 13 is provided with an annular channel 13a in which is disposed a sealing ring 14 that is substantially cylindrical in cross section and preferably formed of a resilient material, such, for example, as rubber or a material that would be effective to closely engage with a cylindrical or shaft member. Either one or both inner side walls may be provided with serrated or like faces 13b for a purpose that will presently appear. Also disposed in the housing channel 13a and engaging with the outer periphery of the sealing ring 14 is a garter spring 15. The inside diameter of the garter spring 15 is normally of a less diameter than the outside diameter of the sealing ring 14 and when in assembled relation acts to compress the sealing ring 14 against the cylindrical rotatable member 10. Preferably, the housing 13 is provided with a bore of greater diameter than the rotatable member 10 so as to permit self centering of the sealing elements.

It is to be noted that, in axial cross section, the diameter of the sealing ring 14 is greater than the width of its retaining channel. In assembling the sealing ring 14 its cross-sectional diameter is compressed by the side walls and engages with the serrations 13b in the channel 13a and thus the sealing ring 14 is restrained against rotating in the channel by its frictional contact with the channel side walls and the serrated face or faces. With the present combination of a resilient sealing ring 14 and a garter compressing spring 15 the sealing elements are self-centering and urged into close contact with the rotatable member 10.

The housing 13 is provided with vents 16 that connect with the interior channel 13a for the purpose of preventing an accumulation of undesirable internal pressures.

At Fig. 3 the housing 17 is provided with a pair of channels 18, 19 and each channel is provided with a sealing ring 20 and garter compressing spring 21 of the character above described.

While the present illustration shows and describes a preferred embodiment of the invention, it is to be understood that it is capable of many modifications. Changes, therefore, in the construction and arrangement may be made without departing from the spirit and scope of the invention as disclosed and set forth in the appended claim, in which it is the intention to claim all novelty inherent in the invention as broadly as permissible in view of the prior art.

What I claim is:

A pressure seal for inner and outer cooperating members comprising a housing in said outer member, said housing having an annular channel therein open to said inner member, a resilient annular element disposed in said channel and bearing against said inner member, said annular element having a normal width greater than the width of said channel, a spring surrounding said annular element, said spring having a normal inside diameter less than the outside diameter of said annular element whereby said spring distorts the cross sectional area of the annular member and forces it against said inner member, and a vent extending from the annular channel at a point adjacent said spring to the inner member on the low pressure side of said annular element.

CAMERON GUILER.

REFERENCES CITED

The following references are of record in the file of this patent:

UNITED STATES PATENTS

| Number | Name | Date |
| --- | --- | --- |
| 1,618,511 | Burstall | Feb. 22, 1927 |
| 1,861,211 | Gammeter | May 31, 1932 |
| 1,861,755 | Rasmussen | June 7, 1932 |
| 1,986,285 | Pollitz | Jan. 1, 1935 |
| 2,004,921 | Blue | June 18, 1935 |